Dec. 13, 1960     H. BUERGER     2,964,355
VEHICLE WHEEL COVERS AND LOCK RINGS FOR SECURING
SUCH COVERS TO AN AUTOMOTIVE VEHICLE WHEEL
Filed July 22, 1955

INVENTOR.
HERBERT BUERGER
BY
*J. B. Felshin*
ATTORNEY.

United States Patent Office 2,964,355
Patented Dec. 13, 1960

2,964,355

VEHICLE WHEEL COVERS AND LOCK RINGS FOR SECURING SUCH COVERS TO AN AUTOMOTIVE VEHICLE WHEEL

Herbert Buerger, 129 North St., Walton, N.Y.

Filed July 22, 1955, Ser. No. 523,877

4 Claims. (Cl. 301—37)

This invention relates to vehicle wheel covers and lock rings for securing such covers to an automotive vehicle wheel.

One object of this invention is to improve the construction disclosed in my application Serial No. 502,684, filed April 20, 1955, now abandoned, for Ornamental and Protective Vehicle Wheel Covers.

It has been heretofore known to provide wheel covers or lock rings therefor with spring fingers having outer ends engaging the flange of a wheel tire rim to hold the cover in position over the side of the wheel. With such prior constructions, when the wheel cover was moved into engaging position relative to the tire rim flange, the outer ends of the fingers engaged the flange so that the fingers would be flexed as the wheel cover is begun to be pushed into cover position. With such construction it was difficult to manipulate the cover toward gripping position because the outer fingers had to be flexed considerably at the initial engagement with the flange. There was no provision for guiding the wheel cover into the flange before the outer ends of the spring fingers engaged the flange.

In my copending application, Serial No. 502,684, there is disclosed means to guide the cover into coaxial aligned relation with the wheel rim flange prior to flexing of the spring fingers which grippingly hold the cover to the wheel. The present invention is an improvement of such construction.

In said copending application, the lock ring for the wheel cover is provided with an annular flange formed with bent back spring fingers at its inner end, provided with lips extending radially outwardly beyond the bent back portions of said spring fingers. At the outer side of the annular portion in my said copending application, there was provided a radial flange which is gripped at its outer periphery by a bead on the wheel cover plate. In manufacturing the lock ring it has been found that with the construction shown in my said copending application, the radial flange which contacts and is gripped by the wheel cover plate, has considerable width and difficulty has been experienced in rolling this flange.

It is an object of the present invention to provide a lock ring construction in which the outer flange, which is gripped by the cover plate, is of considerably less width, making it much easier to roll the lock ring.

Another object of this invention is to provide a lock ring of the character described comprising a substantially cylindrical flange having a relatively short radial flange at its outer side, to be gripped by the wheel cover and being formed at its inner side with a plurality of spaced spring fingers, each spring finger having a portion extending from the cylindrical flange radially and axially inwardly thereof, and a portion extending axially of the last portion and an outwardly curved bent back portion extending from the axial portion, and a second axial portion extending outwardly from the bent back portion substantially parallel to the first axial portion, and provided at its end with a lip inclined radially and axially outwardly. With such construction, as the wheel cover is engaged with the flange of the tire rim, the outwardly extending axial portion of the spring finger engages the rim flange and serves as a guide permitting the wheel cover to be easily pushed in a predetermined distance with very light pressure. After the wheel cover is guided into engagement with the flange of the rim, further pressure inwardly will cause the radially and axially outwardly inclined lips of the spring fingers to engage the flange for flexing the spring fingers radially inwardly, with the outer edges of the spring fingers contacting the inner surface of said flange and serving to retain the cover in place against accidental release. With such construction, furthermore, the cylindrical flange of the lock ring is of greater radius than the corresponding flange of the lock ring in my said copending application.

Yet a further object of this invention is to provide a lock ring of the character described in which the cylindrical flange is provided with tapered corrugations extending transversely thereof to increase the resiliency of the cylindrical flange.

Yet a further object of this invention is to provide a strong, rugged and durable lock ring of the character described which shall be relatively inexpensive to manufacture and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention:

Figure 1:
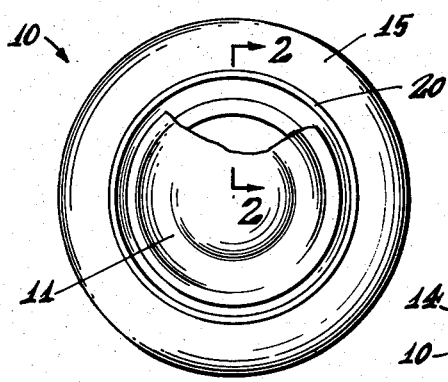
Fig. 1 is a front view of an automotive vehicle wheel provided with a cover and lock ring embodying the invention.

Referring now in detail to the drawing, 10 designates an automotive vehicle wheel of usual construction and 11 designates a vehicle wheel cover comprising a cover plate 12 and a lock ring 13 fixed thereto and holding the cover on the wheel.

The wheel 10 comprises generally a dished wheel body 22 on the rim of which is mounted a tire rim 14 supporting the tire 15. The tire rim 14 may be of the drop center type and comprises a bottom web portion 16 from which extend upwardly and outwardly inclined side walls 18. Extending from the side walls 18 are flanges 17 which taper slightly outwardly. Extending from the flange 17 are radially and axially outward extending portions 19 formed with peripheral curved lips 20.

The cover plate 12 may be of any usual construction and is formed at its outer end with a radially extending peripheral flange 21 provided with a bent back transversely curved folded over bead 24 for the purpose hereinafter appearing.

The lock ring or mounting ring 13 comprises an intermediate wall 25 substantially cylindrical in shape but somewhat axially inwardly and radially outwardly inclined relative to the axis of wheel. Extending radially outwardly from the outer end of the wall 25 is a flange 26 the edge of which is engaged and gripped by the rolled over bead 24 of the cover plate 12. If desired the wall 25 may be formed with transverse corrugations 27. These corrugations taper toward a point 28 located adjacent the flange 26. The corrugations 27 may have downwardly inclined opposed triangular walls 29.

Extending from the inner side of wall 25 are a plurality of spring fingers 30 spaced by slots 31. Each finger 30 comprises a portion 32 which is inclined radially and axially inwardly. Extending from each portion 32 is a portion 33 which extends axially inwardly. Extending from each portion 33 is an outwardly bent back curved portion 34. Extending axially outwardly from each portion 34 is a finger portion 35. The finger portion 35 is substantially parallel to and aligned with the portion 33. Extending radially and axially outwardly from each portion 35 is an inclined lip 36 having an outer edge 37. The lip 36 is located radially outwardly of portion 32.

It will be noted that the portions 35 of the spring fingers 30 are disposed only slightly radially outwardly of the wall 25. Of course the portions 33 of the spring fingers are located radially inwardly of the flange 25. When the wheel cover 11 is to be attached to the wheel, said wheel cover is manipulated to bring the portions 35 of the spring fingers 30 into engagement with the inner surface of the flange 17.

Figure 2:
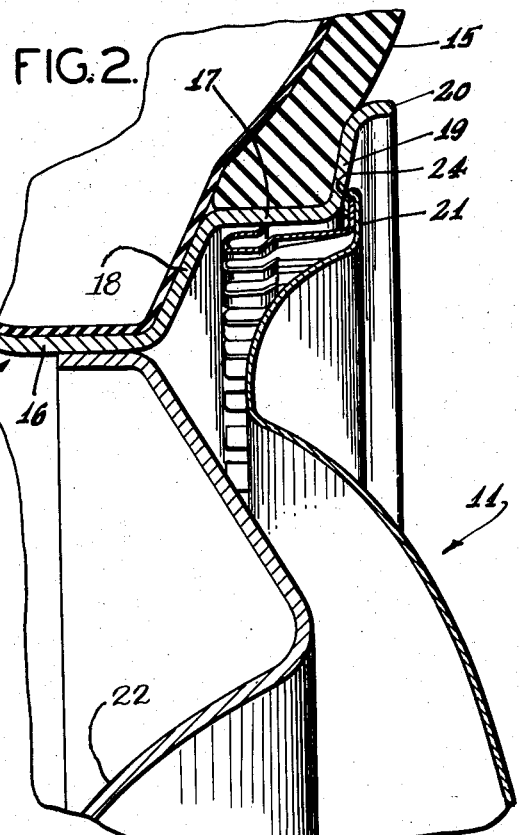
Fig. 2 is an enlarged partial cross-sectional view taken on line 2—2 of Fig. 1.
Figure 3:
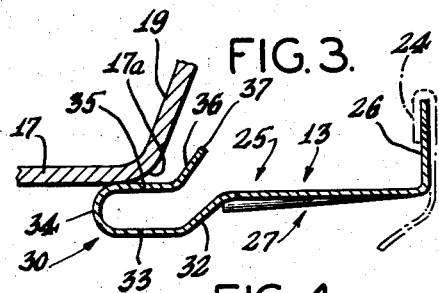
Fig. 3 is a cross-sectional view of the lock ring of Fig. 2 but showing the guiding engagement of the bent back spring finger with the flange of the tire rim.
Figure 4:
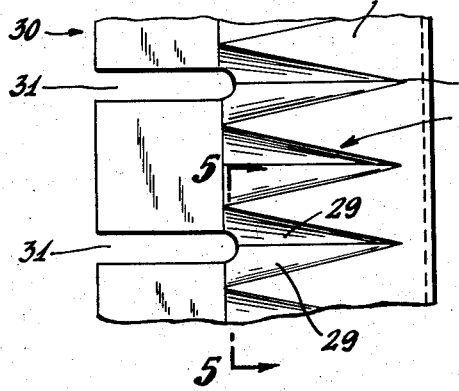
Fig. 4 is a partially developed view of the underside of the ring shown in Fig. 3.
Figure 5:
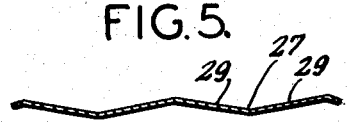
Fig. 5 is a partial cross-sectional view taken on line 5—5 of Fig. 4.

It will be noted that the outer diameter of the spring finger portions 35 is substantially equal to the diameter of the flange 17 at its outer end or entrance point. Thus, the spring fingers are easily engaged within the flange 17 and serve as guide for the wheel cover as the wheel cover is pushed towards the wheel. By the time the lips 36 contact the tire rim portion 19, the wheel cover is fairly well located within the tire rim. Thus, the initial engagement of the wheel cover with the tire rim is easy and provides a vantage point from which the outer rim may be pushed into place. If the lips 36 contact the portions 19, the wheel cover may be pushed radially inwardly causing the lips 36 to ride the curved corner 17a between the flanges 17 and 19. Further movement of the wheel cover axially inwardly of the wheel will cause the edges 37 of the lips 36 to scrape along the inner surface of the flange 17. During the engagement of the lips 36 and the edges 37 with the curved surface 17a and the inner surface of the flange 17, the spring fingers 30 as a whole are flexed radially inwardly from the position shown in Fig. 3 to the position shown in Fig. 2. Thus, the portions 35 of the spring fingers move radially inwardly away from the flange 17 so that only the outer edges 37 of the lips 36 remain in engagement with the inner surface of the flange 17.

It will be observed that with the present construction the wall 25 has greater radius than the corresponding wall in my said copending application, and for this reason the flange 26 may be of less width, which makes it considerably easier to roll the lock ring. The lock ring 13 may be rolled from a flat elongated strip of material. Also, by having the spring fingers extend radially inwardly of the wall 25, the bent back portion 34 may have a greater radius so as to give a good resilient action and to insure against destroying the resilience of the fingers and to prevent bending the fingers out of shape.

In making the lock rings 13, elongated flat strips of metal are cut to length and slotted. Thereafter they are rolled to provide the flange 26 and the fingers 30 and also at the same time the corrugations 27 may be impressed. These strips are cut to such length that the ends thereof may have an overlap which is spot welded. If corrugations are employed, the corrugated portions may be interlocked when the ends are overlapped.

Figure 6:
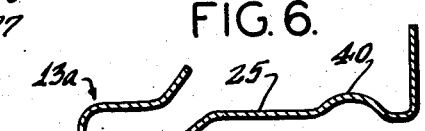
Fig. 6 is a transverse cross-sectional view of a lock ring embodying the invention and illustrating a modified construction.
Figure 7:
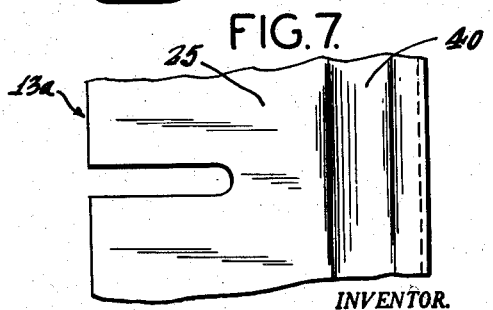
Fig. 7 is a bottom plan view of the structure shown in Fig. 6.

In Figs. 6 and 7 there is shown a lock ring 13a similar to lock ring 13 except that instead of the corrugations 27, the wall 25 may be provided with radially outwardly curved radial bead 40 for strengthening said flange.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. A one-piece lock ring for a wheel cover comprising an annular wall extending generally axially of the axis of the ring, a flange extending radially outwardly from one side of said wall, a plurality of spaced spring fingers integrally extending from the other side of said annular wall, each spring finger comprising a portion extending radially inwardly of said annular wall and beyond said wall, a portion extending axially toward the other side from the last mentioned portion, a radially outwardly bent back curved portion extending from the end of said axial portion, an axial portion extending from the bent back portion toward the first side, and a lip extending radially outwardly from the outer end of said last mentioned axial portion, said annular wall being corrugated transversely.

2. The combination of claim 1, said corrugations tapering outwardly toward a point.

3. A lock ring for a wheel cover comprising an annular substantially cylindrical wall, a radially outwardly extending flange extending from one side of said wall, a plurality of spaced spring fingers spaced from the other side of said annular wall and integral therewith, each finger comprising an inclined radially and axially inwardly extending portion extending from said other side of said annular wall, a portion extending axially inwardly from said radially and axially inwardly extending portion, a radially outwardly bent back curved portion extending from the end of said axially extending portion, an axial portion extending toward said one side from the outer end of said bent back curved portion, and a lip extending radially and axially outwardly from the outer end of said last mentioned axial portion, said annular wall being formed with transverse tapering corrugations increasing in width inwardly.

4. The combination of claim 3, said annular wall being formed with an annular outwardly extending bead of curved transverse cross-section.

References Cited in the file of this patent

UNITED STATES PATENTS

Re. 19,467    Lyon                Feb. 12, 1935
2,713,514    Lyon                July 19, 1955